Sept. 20, 1932.　　　M. WALLACE　　　1,878,737
RADIO BEACON SYSTEM
Filed May 6, 1930　　　3 Sheets-Sheet 2

Sept. 20, 1932.                M. WALLACE                    1,878,737
                            RADIO BEACON SYSTEM
                            Filed May 6, 1930          3 Sheets-Sheet 3

INVENTOR.
Marcel Wallace,
BY
John O. Grady
ATTORNEY

Patented Sept. 20, 1932

1,878,737

UNITED STATES PATENT OFFICE

MARCEL WALLACE, OF ST. GEORGE, NEW YORK, ASSIGNOR OF ONE-THIRD TO EDWARD L. CORBETT, OF BRONX COUNTY, NEW YORK

RADIO BEACON SYSTEM

Application filed May 6, 1930. Serial No. 450,175.

My invention relates broadly to radio beacon systems and more particularly to an automatic control system for the receiving equipment on a mobile body being guided by the beacon system.

One of the objects of my invention is to provide an automatic control circuit for a radio beacon receiver by which the receiving apparatus may be automatically maintained in resonance with the peak of a variable signal for indicating the relative position of the mobile body with respect to a multiplicity of directively transmitted beams of signaling energy.

Another object of my invention is to provide an automatic receiving apparatus responsive to a multiplicity of signaling beams directively transmitted in predetermined spacial relationship over a large navigational area wherein the receiver is automatically tuned to the frequency of the maximum amplitude signal which is received.

A further object of my invention is to provide a system for the electrical navigation of mobile bodies such as ships or aircraft wherein a sense of direction is available to the pilot by the response of a radio receiver to a multiplicity of separated beams of signaling energy in the course of movement of the mobile body with respect to the beams of signaling energy.

Still another object of my invention is to provide a circuit arrangement for an automatic receiving apparatus which is maintained in resonance with the frequency of the signaling beam in closest proximity to the aircraft.

Other and further objects of my invention reside in the automatic control circuit for receiving equipment which may be installed on aircraft for indicating the particular signaling beams over which the aircraft may pass for giving an exact sense of location to the pilot independent of certain conditions.

My invention will be more fully understood from the specification hereinafter following by reference to the accompanying drawings, in which.

For a complete understanding of my invention, reference is made to the beam network system described more fully in my Letters Patent No. 1,802,688, dated April 28, 1931, by which I have explained the method of establishing a multiplicity of beams of high frequency signaling energy over a large area for the operation of the receiving apparatus set forth in the present application.

My invention contemplates the installation of a multiplicity of directional transmitters in predetermined locations throughout the country for providing a network of directionally transmitted beams of signaling energy covering the entire area of the country in which aircraft is navigated. A similar directively transmitted network of radio beacons may be propagated at sea for the navigation of ships. For the purpose of explaining the principles of my invention, I shall limit my description to an aircraft navigation system in which directionally transmitted beams of radio signaling energy are propagated in relatively narrow paths both north and south and east and west throughout the country. A directionally transmitted beam of radio frequency energy has its maximum energy directly upon the center line extending through the transmitting station and this energy drops to about one-half its effective value at one degree on each side of the center line of the transmitter and then the energy drops abruptly to zero. There may be secondary beams at three or four degrees on each side of the centrally propagated beam and there may be more widely distributed tertiary beams, but the signaling energy on such secondary or tertiary beams are incapable of interference with the receiving system inasmuch as these beams diminish to substantially zero in intensity. For example, at a distance of 1,000 miles, a length of only 33 miles subtends an angle of two degrees from the transmitter. Therefore, such a beam does not spread more than 33 miles when 1,000 miles distant from the station. At 600 miles the width of a beam would only be about 20 miles. If the beacon transmitting stations are therefore spaced 20 miles apart simultaneous transmission on the beams will cause an overlapping of the beams at approximately 600 miles away from the transmitter. To avoid needless overlapping, I provide repeating stations in alignment with the initial transmitting stations having the effect of pushing the beam further across the country with greater intensity so that the overapping portion of the beacons is of secondary intensity and is unable to affect the automatic adjustment of the receiving equipment carried upon aircraft. While a large number of transmitter stations are required, the cost thereof is relatively insignificant as compared to the cost, for example, of building a network of automobile highways. The actual power required for each beam transmitter is relatively small for long range effectiveness as compared to that of an ordinary broadcasting station, for in the system of my invention the transmitting energy is concentrated in a narrow beam and operated over a distance where the energy in the beam is effective upon the receiving apparatus, which energy is subsequently renewed by the successive transmitter stations constructed for defining a particular beam in a survey direction across the country. My system of directively transmitted beams extending both longitudinally and laterally with respect to each other over the area of the country may employ loop transmitters having a figure of eight characteristic or a directively transmitted beam which radiates in one direction only. Loop transmitters are desirable where blind spots appear to exist in certain parts of the country against the direct transmission of a beam.

It is not necessary to use a very large number of frequencies in order to thoroughly cover a country such as the United States. The thing that is necessary is a continuity of frequencies in a step by step variation from one band into another. A periodic variation can be utilized. For example, in defining the country from the Atlantic coast to the Pacific coast, this distance can be divided into equal zones, for example, corresponding to the time zones or an arbitrary number of zones may be employed. I contemplate for best operation an arrangement of six zones which I may designate by A, B, C, D, E and F, each zone being about 500 miles in length. That is, zones are divided into approximately thirty frequency bands of equal widths. These bands have an approximate separation of 16.66 miles each which is slightly narrower than is required for accurate aircraft navigation. Twenty-five bands of 20 miles in width per zone may be successively utilized and still impart accurate information to the navigator for enabling the navigator to know his position at all times throughout the flight. Between each zone a separating beam of frequency which I have designated as being of a frequency $f$ is provided running north and south. The first band, furthest east on each zone has a frequency of $f+a$; the second band beam $f+2a$; the third $f+3a$ ... the fifteenth $f+15a$. From then on the frequency drops gradually so that the 16th band has $f+14a$ ... the thirtieth, $f+a$ again and then comes the separating beam of frequency $f$ and after that the next zone with the same variations. In other words, all that is required for covering this whole distance is a band of $15a$ kilocycles. If a separation between beams of $a=2$ kilocycles is taken, all that is required would be 30 kilocycles.

If an allocation is made in the short wave band, say around thirty-five meters, the system of my invention requires only a frequency allocation of from 35.8 to 36 meters. If the allocation is closer to 200 meters, the entire system may operate upon allocations between 196.1 and 200 meters. If the broadcasting band is allotted for the aircraft navigation system of my invention, the wave lengths required would be obtainable between 476 and 500 meters or between 698 and 750 meters. The numbers given are merely for the purpose of illustration as indicating the relatively narrow range of wave lengths or frequencies which is required. It is appreciated that frequencies for the transmission of signaling energy are in great demand but from considerations of safety in air navigation, the relatively small frequency spectrum required for the operation of the radio beacon system of my invention may be readily allocated from the available frequencies. If the transmission channels which I have designated as extending across the country in both lateral and longitudinal directions are utilized for conveying modulated signals, utilizing either voice or television modulation, the separation between bands and the factor $a$ in the expressions $f+a$, $f+2a$, supra, will have to be greater according to the frequency band required to cover the modulation frequency of the messages of the signals without interference between adjacent bands. The numerical relationships which I have referred to are intended for transmission of telegraphic signals which do not require wide signaling bands. Telegraphic signals identifying the different channels may be readily picked up by the aircraft in the course of its flight to impart to the pilot sufficient identifying data to give the pilot a sense of direction and location.

The same grouping in zones could be used for the parallel beams running east and west, but in order to diversify my example, I shall consider only one zone with beams starting from a frequency F and gradually increasing to $F+NA$, in which N equals the total number of bands divided by two and A is the number of kilocycles between adjacent beams. If a width of say 2,000 miles is to be covered, there would have to be 100 bands of 20 miles each. N would equal 50. If these bands are separated by only one kilocycle, a band of only fifty kilocycles is necessary, which is less than double the one above.

Figure 1:
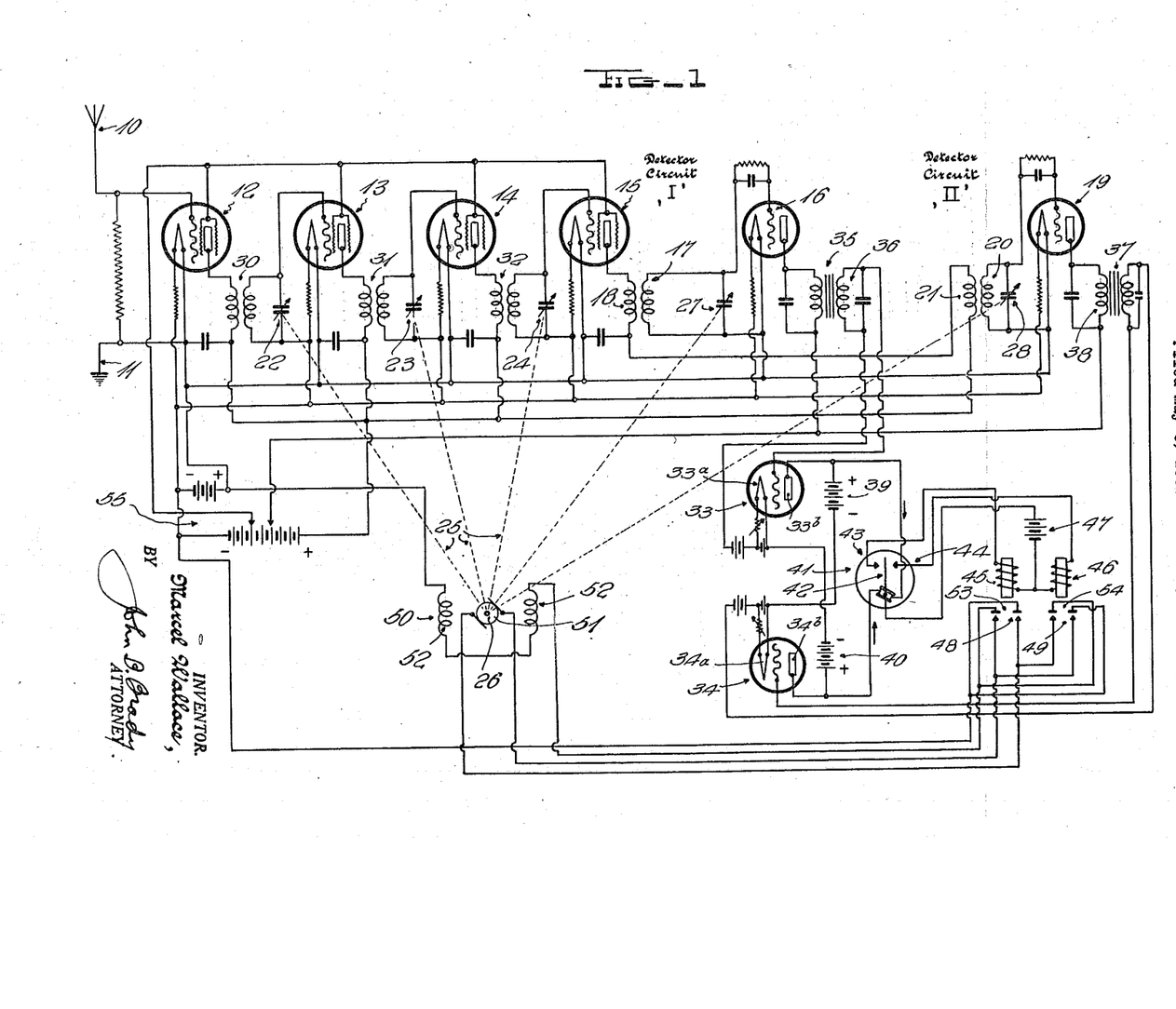
Figure 1 is a diagrammatic circuit arrangement of one form of automatic receiver embodying my invention, which receiver is operative in accordance with signaling energy received from a multiplicity of directionally propagated beams of high frequency energy.

The receiving apparatus illustrated in Fig. 1 includes aperiodic antenna ground circuit 10—11 which is installed on the aircraft, which antenna ground system connects to the input circuit of a radio frequency amplifier comprising screen grid tubes 12, 13, 14 and 15. The output circuit of the radio frequency amplifier 12—15 is supplied to the input circuit of two independent detector systems. One detector system includes electron tube 16 coupled by means of circuit 17 to the output circuit 18 of the radio frequency amplification system. The other detector is illustrated at 19 having its input circuit 20 coupled by means of winding 21 with the output circuit of the electron tube 15. That is to say, the output circuit of the last stage of radio frequency amplification 15 includes windings 18 and 21 which independently couple with the input circuits of the detectors 16 and 19. The input circuit of the radio frequency amplifiers stages 13, 14 and 15 are tuned by condensers 22, 23 and 24 each adjusted by rotation of shaft 25, the equivalent of which I have indicated by the angularly disposed lines which emanate from the shaft of the driving motor at 26. The input circuit 17 of detector 16 is tuned by variable condenser 27. The input circuit 20 of detector tube 19 is tuned by variable condenser 28. The circuits 17 and 20 are slightly detuned in relation to the tuned circuits of the radio frequency amplifier in a definite relation. That is, one detector circuit is tuned for a slightly higher frequency signal and the other detector circuit is tuned for a slightly lower frequency signal. For the purpose of explaining my invention, the detector circuit I is tuned normally to a frequency slightly higher than the frequency to which detector circuit II is adjusted. That is, the detector circuit I is tuned to a frequency about the maximum peak of the radio frequency amplifier including tubes 12, 13, 14 and 15, while detector circuit II is tuned slightly below the maximum peak of the radio frequency amplifier system. That is to say, the radio frequency amplifier system is broadly tuned and is responsive to a plurality of frequencies on either side of the maximum peak frequency whereas the detector circuits I and II are sharply tuned to a particular frequency. The radio frequency amplifier system is somewhat aperiodic whereas the detector circuits must each be selectively tuned for a particular frequency. The coupling transformers 30, 31 and 32 which interlink the input and output circuits of the several tube systems have a relatively broad response characteristic enabling the radio frequency amplifier to amplify uniformly over a relative wide frequency band as compared to the selected characteristics of the circuits coupling the detectors to the radio frequency amplifier. The output circuit of detector tube 16 connects to the input circuit of a highly biased vacuum tube 33. The output circuit of detector tube 19 connects to the input circuit of the highly biased vacuum tube 34. In order to render the operating characteristics of each of the detector circuits extremely sharp, I provide a transformer 35 interlinking the output circuit of detector 16 with the input circuit of the tube 33 which is highly selective in its audio frequency characteristics. The selectivity may be increased by tuning the coupling circuit at 36 according to the modulation or keying frequency of the beacon transmitters. The selectivity of the detector system 19 may be further increased by the characteristics of the coupling transformer system 37 which may be selectively tuned if desired to a particular keying frequency by means of tuned input circuit 38. The tubes 33 and 34 have their filaments 33a and 34a heated by independent batteries. The plate electrodes 33b and 34b are positively charged by separate batteries 39 and 40 connected as shown so that the plate currents of each tube must pass through the same polarized relay 41 but in reversed directions. The relay tongue 42 is thus moved either to the right or left-hand contacts 43 or 44 depending upon the direction of the current through the relay. The A. C. components from the secondary circuits 32 and 38 leading from the two detector systems vary in amplitude according to the amplitude of the signaling energy. If the aircraft approaches more closely a beam of radio frequency energy which exceeds in amplitude, the signaling energy of the radio frequency being from the aircraft, is receding then the detector circuit which is selectively tuned to the frequency of dominating amplitude will be energized to produce maximum current in a particular direction through the windings of the polarized circuit relay thus controlling the closing of the polarized relay in a particular direction.

Figure 4:
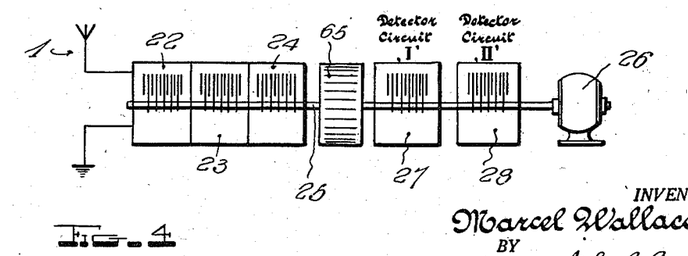
Fig. 4 is a schematic view showing the arrangement of automatic tuning apparatus employed in the receiving apparatus of Fig. 1.

I provide a control circuit connected to the contacts 43 and 44 of the polarized relay which includes a pair of independent relays 45 and 46 connected to a common battery circuit 47 so that when the relay 41 is closed in either direction, either of the relay windings 45 and 46 will be selectively energized. The relay windings 45 and 46 independently control sets of contacts 48 and 49 which connect the field and brush contacts of a direct current motor 50 as illustrated. The motor 50 includes armature 51 and field windings 52. The armature brushes connect to the movable contacts 48 and 49 of each relay 45 and 46. Cooperating contacts 53 and 54 connect in reverse order and connections extend from one of each of the sets of contacts 53 and 54 to the source of power 55 which also supplies energy for operating the radio receiving apparatus. The other contact of the sets of contacts 53 and 54 connects to the field winding 52 of the motor. The current through the field is reversed with respect to the current through the armature thereby reversing the direction of rotation of the motor according to the movement of member 42 with respect to contacts 43 and 44. The relay 41 has a central neutral position when the current in the two detector circuits is balanced and under this condition both relays 45 and 46 are deenergized so that the motor circuit 50 is deenergized and the motor remains stationary. When one detector circuit receives signaling energy stronger than the signaling energy in the other detector circuit, the motor 50 starts operating and will turn in either of two predetermined directions. The motor 50 drives the rotary shaft 25 which shaft as illustrated in Fig. 4 carries all of the variable condensers of the entire receiving system, that is, condensers 22, 23, and 24 in the radio frequency amplifier, and condensers 27 and 28 in the detector circuits.

Figure 3:
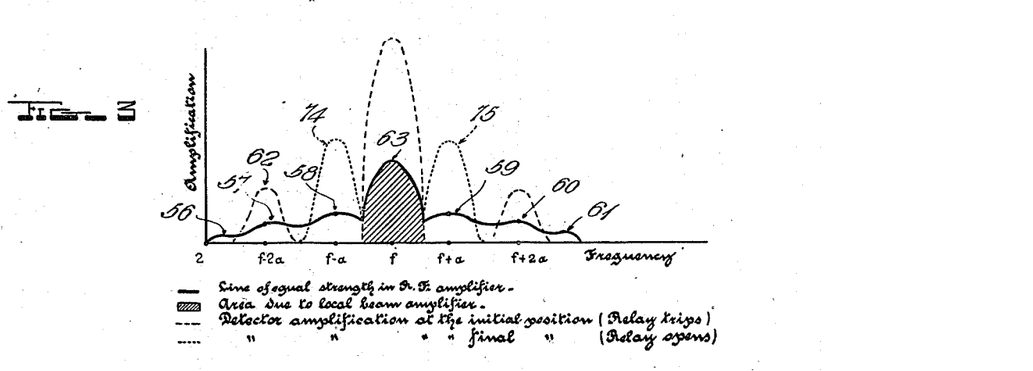
Fig. 3 shows a characteristic curve illustrating the theory of operation of the receiving apparatus of my invention.

In Fig. 3, I have illustrated a typical condition which may exist as a plane travels from one beam to another in the course of its flight. The ordinates in the chart of Fig. 3 represent amplification of the signal, while the abscissa represent signal frequency. If the aircraft equipped with the receiving circuit of Fig. 1 is flying north and south on a beam having a frequency $f$ on which a beacon station is continuously transmitting a 2,000 cycle note, the radio frequency amplifier being a broad response characteristic receives this signal and amplifies it according to the shaded area in the curve of Fig. 3. That is, the shaded area of the curve in Fig. 3 represents the signal amplification of the local beam in the radio frequency amplifier. The side humps on the curve designated at 56, 57, 58, 59, 60 and 61 are due to the relatively weak signals which are received from adjacent beams. Assuming that detector circuits I and II are tuned respectively for signal of a frequency of $f-2a$ and signal $f$, the signaling energy in detector circuit 1a is relatively weak as represented by dotted lines 62. The two signals represented by the shaded area $f$ at 63 and the signal represented by the dotted line 62 are very unequal and the ralay 41 operates, the motor 50 starts turning the tuning condenser 27 of the detector circuit I toward the peak signal, and the tuning condenser 28 of the detector circuit II away from the peak signal. The condenser shaft 25 revolves until both detector circuits are equally out of tune. The one detector circuit is tuned for $f-a$ and has a characteristic curve illustrated at 74, and the other detector circuit is tuned for $f+a$ and has a characteristic curve illustrated at 75. The relay 41 then opens and the motor 50 stops. As the signal strength in one detector circuit again changes in magnitude with respect to the signal strength in the other detector circuit, movement of the condenser shaft 25 is again initiated.

Figure 2:
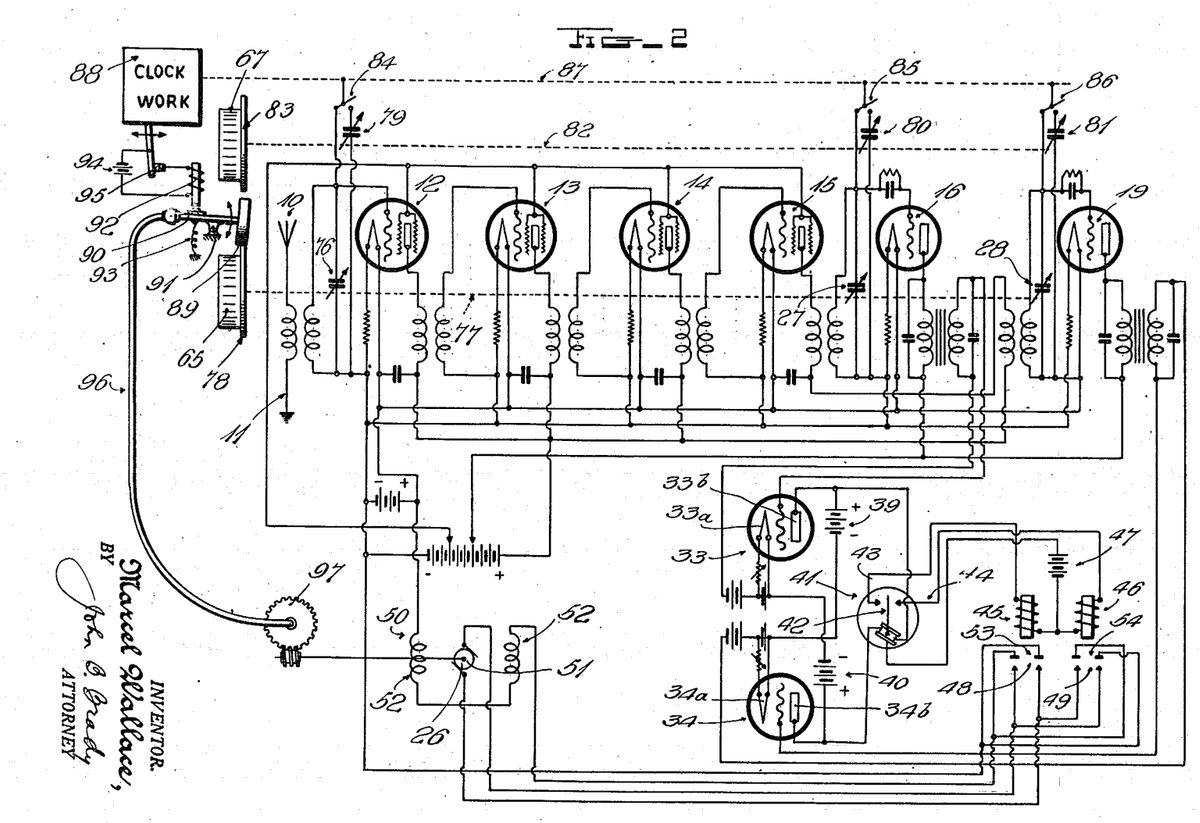
Fig. 2 is a modified circuit arrangement of the receiving apparatus of my invention.

In Fig. 2, I have shown a modified form of receiving apparatus which operates to indicate to the pilot not only the signaling characters receivable on the north and south beams, but also the signaling energy of predetermined characteristic which is receivable upon the east-west beams. A multiple frequency selector system must be provided in the receiver to periodically shift the tuning adjustment of the receiver from one frequency band to another frequency band. I accomplish this by providing an antenna circuit 10—11 which is aperiodic to the entire frequency band covered by any of the signaling zones. The input circuit to the radio frequency amplifier stage 12 is tuned by condenser 76, the output circuit being coupled to the input circuit of the radio frequency amplifier stage 13 which is untuned but is responsive to the entire frequency band covered by the north-south and east-west beams. Similarly, the output of the amplifier stage 13 is coupled to the input of the amplifier stage 14 which is in turn coupled to the next succeeding amplifier stage 15, all of which stages respond broadly to the frequency bands over which the receiver must operate. The detector circuit I including tube 16 and detector circuit II including tube 19 are both connected to the output circuit of the radio frequency amplification stage 15 in the manner set forth in Fig. 1. The tuning condenser 27 which connects across the input circuit of detector tube 16 is responsive to the entire range of frequencies receivable upon the north and south beams. Similarly, the variable condenser 28 is responsive to the frequency range receivable on the north and south beams. Condensers 76, 27 and 28 are all simultaneously driven through control shaft 77 from drive gear 78 to which is attached the indicator drum 65. The control circuit for the driving motor is similar to the arrangement described in Fig. 1 and similar reference characters have been used to identify corresponding parts. In order to adjust the receiving apparatus to respond to the frequencies received on the east and west beams, I provide a set of auxiliary variable condensers shown at 79, 80 and 81, these condensers being arranged on an auxiliary drive shaft 82 controlled from drive gear 83 to which is attached the indicator drum 67. Condensers 79, 80 and 81 are normally disconnected from the tuning circuits of the receiving apparatus so that the receiving apparatus is free to respond to the signaling energy received on the north and south beams. Periodically, however, I shift the tuning range of the receiver by closing switch devices 84, 85 and 86 which operates to place condensers 79, 80 and 81, respectively, in parallel with tuning condensers 76, 27 and 28, thus increasing the tuning range of the receiver enabling the receiver to respond to the frequencies emitted on the east and west beams. The switches 84, 85 and 86 are periodically closed through a common operating means 87 which is driven by a clock work 88. These switches are closed at periodic time intervals so that the pilot is enabled to automatically sweep the frequency range of the beams in both directions. The automatic tuning of the receiving apparatus is controlled by a change gear device represented at 89. The device 89 is in the nature of a friction disc carried by a shaft which is rotatable within a pintle 90 pivoted at 91. The friction wheel 89 is engageable either with gear 83 or 78 according to the action of the electromagnetic control device 92 or the spring 93. The electromagnetic control device 92 has its circuit 94 periodically opened to close by the operation of the clock work mechanism 88 which controls the opening and closing of contacts 95. The friction wheel 89 is driven through flexible shaft 96 from reduction gear 97 which is operated by motor 50. The flexible shaft 96 is revolved in opposite directions depending upon the condition of balance or unbalance of the receiver with respect to the signaling frequency and corresponding movement is imparted to gears 78 and 83 for revolving condenser shafts 77 and 82 for bringing the receiver to a condition of balance for the particular signaling frequency. The time intervals over which the receiver changes its frequency range may be lengthened as may be desired in accordance with the adjustment of gearing interposed between the clock work and shaft 87 and located between the clock work and the actuating device for the contacts 95.

Figure 5:
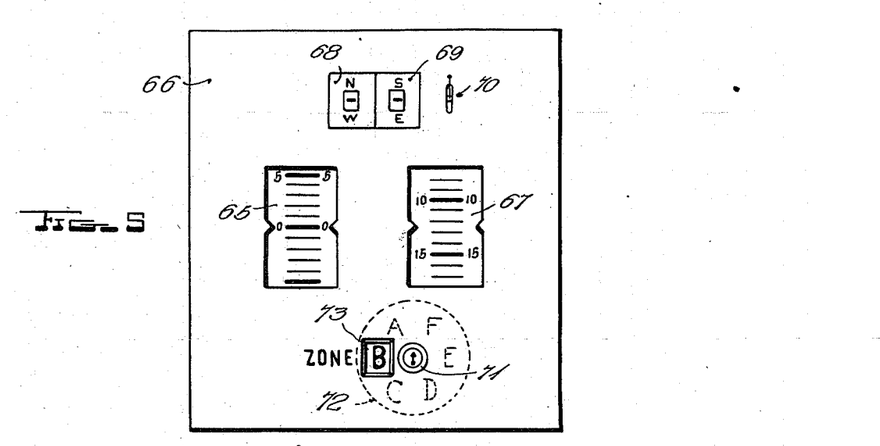
Fig. 5 is a representative panel arrangement for the receiving apparatus diagrammatically shown in Fig. 2 of the drawings.

In Fig. 5, I have shown a typical layout of the panel of the aircraft receiver in which the apparatus of Fig. 2 is arranged. The dial 65 on the self-tuning receiver for the meridian beams is graduated only from 0 to 15, and the dial 67 for the parallel beams from 0 to 50. It can be seen that in crossing a meridian zone from its border, dial 65 will indicate gradually from 0 to 15 as the aircraft goes from east to west and after passing the center line, the dial will read gradually back to zero where a new zone starts. It is consequently necessary to have an additional indication which should differentiate the east side from the west side of each zone. This is accomplished by means of an additional signal, periodic or continuous, sent on these beams. For example, a dot-dash sent at regular intervals indicates the east side, and a dash-dot the west side; or a high frequency note sent at intervals indicates one side, a low frequency note the other side. This requires periodic listening-in for the operator which is not objectionable. However, in order to render the system entirely automatic without the necessity of listening-in, the panel of the receiver 66 or dashboard is provided with two vibrating reed instruments 68 and 69 each responding to one of the frequencies sent for differentiating the east zone from the west zone. The same method is applied for differentiating between north and south on the parallel beams, although the occasion to do so is much rarer in the ordinary course of travel. A simple switching arrangement 70 puts the vibrating reed instrument on the parallel beam receiver or on the meridian beam receiver at will. These vibrating reeds are connected in the output circuit in a manner similar to the connection of a loud speaker in the output circuit of a tube system.

To obtain maximum efficiency in the operation of the receiver, the pilot may keep a record of the zone through which he is flying by operation of the knob 71 which connects to dial 72 which may be shifted in position behind an observing aperture 73 to indicate to the pilot the particular zone in which the craft is flying.

The parallel beams may be established across the country by extended wire lines extending at right angles one to another across the country forming a radiating network for high frequency energy, the frequency progression being selected in the manner of the frequency progression of the beam or directional transmitters heretofore described. The signals in one wire system varies either in frequency or in the method of modulation from the signals in the adjacent wire system to enable the distinctive characteristics to be readily observed in the receiver on the aircraft. The difference in frequency enables the receiver on aircraft to seek a condition of balance or the same position of balance may be reached if the signals are distinctive in their transmission characteristics such as a particular tone or a particular grouping of signal characters.

In the system of directional beam transmitters wherein signals emanate in predetermined directions, the signaling characters on one beam further distinguish from the signaling character which is transmitted on an adjacent beam so that the operator as soon as the maximum peak signal is tuned-in will be given a definite sense of location. That is, irrespective of the conditions of the weather and under conditions of poor visibility, the pilot receives definite information from the system of beams advising him of his exact position. The dials on the receiving panel 66 which are automatically revolved may be calibrated either in beam number or longitude, or any other convenient calibration showing the exact location of the observer in relation to the beam system may be employed.

The frequency separations may be different on the different beams. Narrow bands have the advantages of economy of wave length allocation although they have the disadvantage of requiring very sharply tuned apparatus involving more stages of amplification with very loose couplings and are inherently less sensitive. Wider bands have the advantage of enabling the transmission of certain additional signals on their channels such as weather information, time signals, or photographic or television signals.

I have illustrated the radio frequency amplifier as tuned but it will be understood that the tuning is very broad. I may eliminate the tuning entirely so that the amplifier operates to amplify on practically a straight line. The detector circuits I and II, however, are always sharply tuned. The number of radio frequency stages is determined according to the sensitivity required for the separation of the transmitting beams. I have not illustrated any system of audio frequency amplification, but it will be understood that the detector circuits may be followed by one or more stages of audio frequency amplification in order to handle more power for actuating the relay 41.

In the system of my invention the displacement in tuning the detector circuits must be initially set with respect to the tuning of the radio frequency amplifier, that displacement being selected which will enable the receiving apparatus to be operated by two adjacent frequencies for the automatic movement of the condenser shaft and the tuning of the receiver to a condition or balance.

Where the pilot desires to fly a predetermined course, that course between beams or on a particular beam is selected, and the readings on the dials maintained constant as the aircraft is driven in its line of flight. Any departure from the predetermined beam is indicated by a change of readings on the dials.

Modifications of my invention may be made and I desire that it be understood that no limitations upon my invention are intended other than are imposed by the scope of the appended claims.

What I claim as new and desire to secure by Letters Patent of the United States is as follows:

1. In a system of aircraft navigation, a multiplicity of directively transmitted radiating paths of energy having progressively different signaling characteristics for marking a navigable course, means on an aircraft for receiving the energy radiated on said paths, a receiving apparatus carried by the aircraft and connected with said means, a circuit included therein for receiving signaling energy from a plurality of said radiating paths and separate circuits connected to said aforesaid circuit and selectively responsive to the progressively different signaling characteristics of the transmitted energy for tuning said apparatus to the peak signal receivable on the aircraft from said radiating paths for indicating the position of the aircraft with respect to characteristics of the energy received from said paths.

2. In a system of aircraft navigation, a multiplicity of directively transmitted paths of radio frequency energy, signals of progressively different characteristics superimposed on said radiating paths of energy for marking a navigable course, means on aircraft for receiving the energy radiated on said paths, a receiving apparatus carried aboard the aircraft and connected with said means and responsive to the energy radiated by adjacent radiating paths, selective circuits in said apparatus each responsive to energy receivable from immediately adjacent paths, and means actuated by said selective circuits for automatically adjusting said receiving apparatus to resonance with the signaling energy of maximum amplitude receivable from adjacent radiating paths for indicating the position of the aircraft with respect to said radiating paths.

3. In a system of aircraft navigation, a network of transmission paths of progressively different frequencies, a receiving apparatus carried by an aircraft and responsive to signaling energy receivable from said network of transmission paths of signaling energy, said receiving circuit including a radio frequency amplifier responsive to a range of frequencies covering the frequencies on which signaling energy is emitted in said paths of signaling energy, independent selector circuits connected with said radio frequency amplifier, tuning means for said apparatus, and means operated by said selective circuits for actuating said tuning means for adjusting said apparatus to resonance for a signal of maximum amplitude receivable from said paths of signaling energy as the aircraft moves over the network of transmission paths.

4. In a system of aircraft navigation, a plurality of radiating paths of signaling energy having progressively different signaling characteristics for marking a navigable course, a receiving apparatus carried aboard aircraft and responsive to a band of frequencies embracing the transmission frequencies of two adjacent radiating paths, independent detector circuits connected with the output of said receiving apparatus, one of said detector circuits being tuned to a frequency slightly different than that of the second detector, and means operative by said detector circuits for automatically adjusting said receiving apparatus to the maximum peak signal receivable from said radiating paths for indicating the position of the aircraft with respect to the radiating paths of progressively different characteristics.

5. In a system of aircraft navigation, a plurality of radiating paths extending in spaced relation across a line of flight, said radiating paths each having different frequency signaling characteristics progressively differentiating geographical areas along the line of flight, a pick-up circuit for the radiated energy carried by an aircraft, a receiving apparatus carried aboard the aircraft and connected with said pick-up circuit, said receiving apparatus including a radio frequency amplifier responsive to the signaling energy of different frequency characteristics across the line of flight received from adjacent radiating paths, separate detector circuits each selectively responsive to signaling energy of slightly different frequencies, a driving motor system, means controlled by said detector circuits for regulating the direction of movement of said driving motor system, and tuning means for said receiving circuit and said detector circuits operated by said driving motor system for adjusting said receiving apparatus at the maximum peak signal receivable from said radiating paths for indicating the geographical position of the aircraft with respect to said radiating paths.

6. In a system for aircraft navigation, a multiplicity of radiating paths of signaling energy progressively differentiating in frequency characteristics, a receiving apparatus carried aboard aircraft, said receiving apparatus having means responsive to the frequencies of all of the said radiating paths, means connected to said receiving apparatus and selectively responsive to frequencies of adjacent radiating paths, and means controlled by said last mentioned means for tuning said receiving apparatus to the signal of maximum amplitude receivable from said radiating paths for locating the aircraft with respect to said paths.

7. In a system for navigating aircraft, a plurality of radiating paths of energy progressively changing in frequency characteristics, a receiving apparatus carried by aircraft and responsive to the entire band of frequencies emitted by said radiating paths, selective circuits connected with said receiving apparatus, each of said selective circuits being adjustable to signaling frequencies on adjacent radiating paths and automatic means controlled by said selective circuits for tuning said receiving apparatus to resonance with the maximum amplitude signal from adjacent radiating paths for indicating the position of the aircraft with respect to said radiating paths.

8. In a system for navigating aircraft, a plurality of radiating paths of energy progressively changing in frequency characteristics, a receiving apparatus carried by aircraft and responsive to the entire band of frequencies emitted by said radiating paths, selective circuits connected with said receiving apparatus, one of said circuits being normally tuned to a frequency on one side of the peak frequency of said receiving apparatus and the other of said selective circuits being tuned to a frequency on the other side of the peak frequency of said receiving apparatus, balanced relay circuits controlled by said selective circuits, a driving motor actuated by said balanced relay circuit, tuning means in said receiving apparatus controlled by said driving motor whereby conditions of unequal signal in said selective circuits unbalances a normally balanced condition of said balanced relay circuit for actuating said motor and adjusting said tuning means to a condition restoring the balance of said balanced relay circuit and serving to locate the position of the aircraft with respect to said radiating paths.

9. In a system of aircraft navigation, a multiplicity of directively located radiating paths of radio frequency energy progressively varying in frequency according to geographical areas, a pick-up circuit for the transmitted energy carried by the aircraft, receiving apparatus carried aboard aircraft and connected with said pick-up circuit, said receiving apparatus including a tuning system broadly responsive to frequencies within the range of said multiplicity of radiating paths, selective circuits connected with said apparatus, one of said selective circuits being normally detuned with respect to the other of said selective circuits, a relay circuit controlled by both of said selective circuits, and a reversible motor controlled by said relay circuit, said reversible motor operating to adjust said selective circuits and to control said tuning means for tuning said apparatus to the maximum peak signal receivable on the aircraft from adjacent radiating paths for locating the geographical position of the aircraft with respect to said radiating paths of differing frequency characteristics.

10. In a system of aircraft navigation, a plurality of directively transmitted radiating paths of high frequency energy said paths having progressively differing frequencies according to the geographical arrangement thereof over the country, a high frequency energy pick-up circuit carried by the aircraft, a receiving apparatus carried by the aircraft and connected with said pick-up circuit, said apparatus including a circuit responsive to all of the frequencies transmitted in said radiating paths, selective circuits connected to said aforementioned circuit, tuning means for said receiving apparatus and each of said selective circuits, a reversible motor connected to control said tuning means and said selective circuits, and means controlled by said selective circuits for actuating said reversible motor when a multiple number of signals of different frequencies having unequal amplitudes are received by said receiving apparatus from said plurality of radiating paths for automaticaly shifting said tuning means to a position where said receiving aparatus responds to the signaling energy from a plurality of radiating paths with equal amplitude.

11. In a system of aircraft navigation, a plurality of directively transmitted radiating paths of energy having differing frequency characteristics for designating a navigable course across the country, means on aircraft responsive to the transmitted energy, a receiving apparatus carried abroad aircraft and connected with said means, said apparatus including a radio frequency amplifier system and a pair of selectively tuned detector circuits, a relay circuit controlled by said pair of selectively tuned detector circuits, a reversible motor controlled by said relay circuit, tuning means for said radio amplifier system and for each of said selective detector circuits, said reversible motor being connected to control said tuning means and the tuning of said selective detector circuits and operative upon receipt of unequal amounts of energy from adjacent radiating paths for shifting said tuning means to a position for receiving equal amounts of energy from said radiating paths for locating the aircraft with respect to said radiating paths.

12. In a system of aircraft navigation, a plurality of directively transmitted radiating paths of energy having differing frequency characteristics for designating a navigable course across the country, means on aircraft responsive to the transmitted energy, a receiving apparatus connected with said means comprising a radio frequency amplifier, means for tuning said radio frequency amplifier over the range of frequencies emitted by said plurality of radiating paths, a pair of selective detector circuits connected to the output of said radio frequency amplifier, a relay circuit controlled by said pair of selective detector circuits, said relay circuit including a relay therein having a neutral position and two limiting positions, said relay being maintained in the neutral position when equal amounts of signaling energy are received from adjacent radiating paths and being shiftable to either of the limiting positions thereof when the signaling energy received from adjacent radiating paths is unequal, a reversible motor controlled by said relay, connections between said reversible motor and said tuning means and with each of said selective detector circuits, whereby movement of said relay to either of said limiting positions operates said reversible motor in either direction for adjusting said tuning means and said selectively tuned detector circuits for equalizing the energy supplied to said relay for restoring said relay to neutral position for stopping said motor and indicating the position of the aircraft with respect to said radiating paths.

13. In a system of aircraft navigation, a plurality of directively transmitted radiating paths of signaling energy having differing frequency characteristics for designating a navigable course across the country, means on aircraft responsive to the transmitted energy, a receiving apparatus carried abroad aircraft and connected with said means, said apparatus including a radio frequency amplifier tunable over a range embracing all of the frequencies transmitted by the radiating paths, a pair of selective detector circuits connected with said radio frequency amplifier, a relay control system connected with said pair of selective detector circuits, a relay in said relay control system, said relay having a neutral position in either of two limiting positions, and a reversible motor controlled by said relay for adjusting said radio frequency amplifier and said selective detector circuits to a position in which the energy supplied to said relay control system is equalized upon receipt of signaling energy from said radiating paths on a plurality of frequencies of unequal amplitudes for indicating the position of the aircraft with respect to said radiating paths.

14. In a system of aircraft navigation, a plurality of directively transmitted radiating paths of energy having differing frequency characteristics for designating a navigable course across the country, means on aircraft responsive to the transmitted energy, a receiving apparatus carried aboard aircraft and connected with said means, said apparatus including a radio frequency amplifier tunable over a range embracing all of the frequencies transmitted by the radiating paths, a pair of selective detector circuits each normally detuned one with respect to the other, a relay control circuit including a relay shiftable from a neutral position to either of two limiting positions, a reversible motor controlled by said relay for simultaneously tuning said radio frequency amplifier and said selective detector circuits upon receipt of signaling energy from a plurality of radiating paths at unequal amplitudes for tuning one of said selective detector circuits more closely to resonance with the signaling energy received from one of the radiating paths, while detuning the other of said selective detector circuits more remotely from the frequency of the signaling energy received from another of said radiating paths for effecting a condition of equal signal response in said relay control circuit and stopping said motor for indicating the position of the aircraft with respect to said radiating paths.

15. In a system of aircraft navigation, a plurality of directively transmitted radiating paths of energy having differing frequency charcteristics for designating a navigable course across the country, means on aircraft responsive to the transmitted energy, a receiving apparatus carried aboard aircraft and connected with said means, said apparatus including a radio frequency amplifier tunable over a range embracing all of the frequencies transmitted by the radiating paths, a pair of selective detector circuits, one of said detector circuits being normally tuned to a frequency higher than an intermediate frequency within the tuning range of said radio frequency amplifier, and the other of said selective detector circuits being normally tuned to a frequency lower than an intermediate frequency in said radio frequency amplifier, a relay circuit connected with said selective detector circuits, a relay in said relay circuit having a neutral position and either of two limiting positions, a reversible motor controllable in direction by the movement of said relay to said limiting positions, and mechanical means driven by said reversible motor for adjusting the tuning of said selective detector circuits under conditions where said radio frequency amplifier responds to signaling energy of different amplitudes received from a plurality of said radiating paths, said motor operating to increase the frequency adjustment of one selective detector circuit and decrease the frequency adjustment of the other selective detector circuit for effecting a condition of balance in said relay circuit for restoring said relay to neutral position and stopping said motor when equal signal response is obtained from said radiating paths and locating the position of the aircraft with respect to said radiating paths.

16. Receiving apparatus responsive to a wide range of frequencies comprising a receiving circuit, tuning means for automatically and selectively adjusting said circuit for response to a particular frequency within a selected band of frequencies, time controlled means for periodically widening the band of frequencies to which said receiving circuit is responsive for predetermined time intervals, and separate means for selectively adjusting said receiving apparatus to a particular frequency in said widened band of frequencies.

17. A receiving apparatus, tuning means for adjusting said apparatus for response over a relatively wide frequence range, automatic means for selectively setting said tuning means to resonance for any particular signaling frequency within the aforesaid band of frequency, a time actuated device for periodically widening the band of frequencies to which said receiving apparatus is responsive for predetermined time intervals, and separate means for selectively and automatically tuning said receiving apparatus to a particular frequency within said widened band of frequencies.

18. Receiving apparatus comprising a receiving circuit responsive to a predetermined band of frequencies, means for automatically and selectively adjusting said receiving apparatus to any particular frequency within the band of frequencies to which said apparatus is responsive, time actuated means for periodically widening the band of frequencies to which said receiving apparatus is responsive for predetermined time intervals, and automatic means for selectively tuning said receiving apparatus to a particular frequency within the widened band of frequencies to which said apparatus is responsive.

19. Receiving apparatus comprising a receiving circuit responsive to a predetermined band of frequencies, tuning means for selectively and automatically adjusting said receiving apparatus to resonance with a particular frequency within the band of frequencies for which said apparatus is responsive, an indicator operated by said tuning means representing the position of said tuning means for a condition of resonance thereof, time actuated auxiliary tuning means connected with said receiving apparatus for automatically widening the band of frequencies to which said apparatus is responsive for predetermined time intervals, and a separate indicator carried by said auxiliary tuning means and movable to a position indicating a condition of resonance of said receiving apparatus for a frequency within the widened band of frequencies.

20. Receiving apparatus comprising a receiving circuit, means for automatically tuning said receiving circuit to a peak signal within a predetermined frequency band, an indicator connected with said tuning means and movable to a particular position indicating a tuned condition of said receiving circuit, auxiliary tuning means, an indicator operated by said auxiliary tuning means, time controlled means for periodically rendering said tuning means effective for widening the frequency band for which said receiving circuit is responsive for predetermined time intervals, and means for selectively and automatically adjusting said tuning means to resonance for a frequency within the widened frequency range of said receiving circuit for shifting the indicator carried by said auxiliary tuning means to a selected indicating position.

In testimony whereof I affix my signature.

MARCEL WALLACE.